United States Patent [19]
Dym et al.

[11] 4,087,625
[45] May 2, 1978

[54] CAPACITIVE TWO DIMENSIONAL TABLET WITH SINGLE CONDUCTIVE LAYER

[75] Inventors: Herbert Dym; Morris Krakinowski, both of Poughkeepsie, N.Y.

[73] Assignee: International Business Machines Corporation, Armonk, N.Y.

[21] Appl. No.: 755,273

[22] Filed: Dec. 29, 1976

[51] Int. Cl.² ............................................. G08C 21/00
[52] U.S. Cl. ..................................................... 178/19
[58] Field of Search .............. 178/18, 19, 20; 33/1 M, 33/23 J; 340/347 AD, 146.3 SY; 317/249, 261

[56] References Cited
U.S. PATENT DOCUMENTS

| | | | |
|---|---|---|---|
| 3,593,115 | 7/1971 | Dym et al. | 178/19 |
| 3,598,903 | 8/1971 | Johnson et al. | 178/18 |
| 3,875,331 | 4/1975 | Hasenbalg | 178/19 |
| 3,992,579 | 11/1976 | Dym et al. | 178/18 |
| 3,999,012 | 12/1976 | Dym | 178/18 |

*Primary Examiner*—Thomas A. Robinson
*Attorney, Agent, or Firm*—W. S. Robertson

[57] ABSTRACT

A new capacitive tablet has a single layer in which electrodes provide capacitive coupling with a pen to produce signals that correspond to the X and Y dimensions of the position of the pen on the tablet. The electrodes in the single layer are in the form of pairs of complementary shaped, closely adjacent, conductive elements that extend in the Y dimension of the tablet. For sensing the pen position in the Y dimension, an alternating voltage is applied between the two elements of a pair and the pen receives a signal that is a function of the pen position in the Y dimension. The tablet includes a number of such pairs, each having a different X dimension position, and for sensing the pen position in the X dimension, the two electrodes of a pair are given an alternating voltage that differs progressively across the X dimension of the tablet.

8 Claims, 5 Drawing Figures

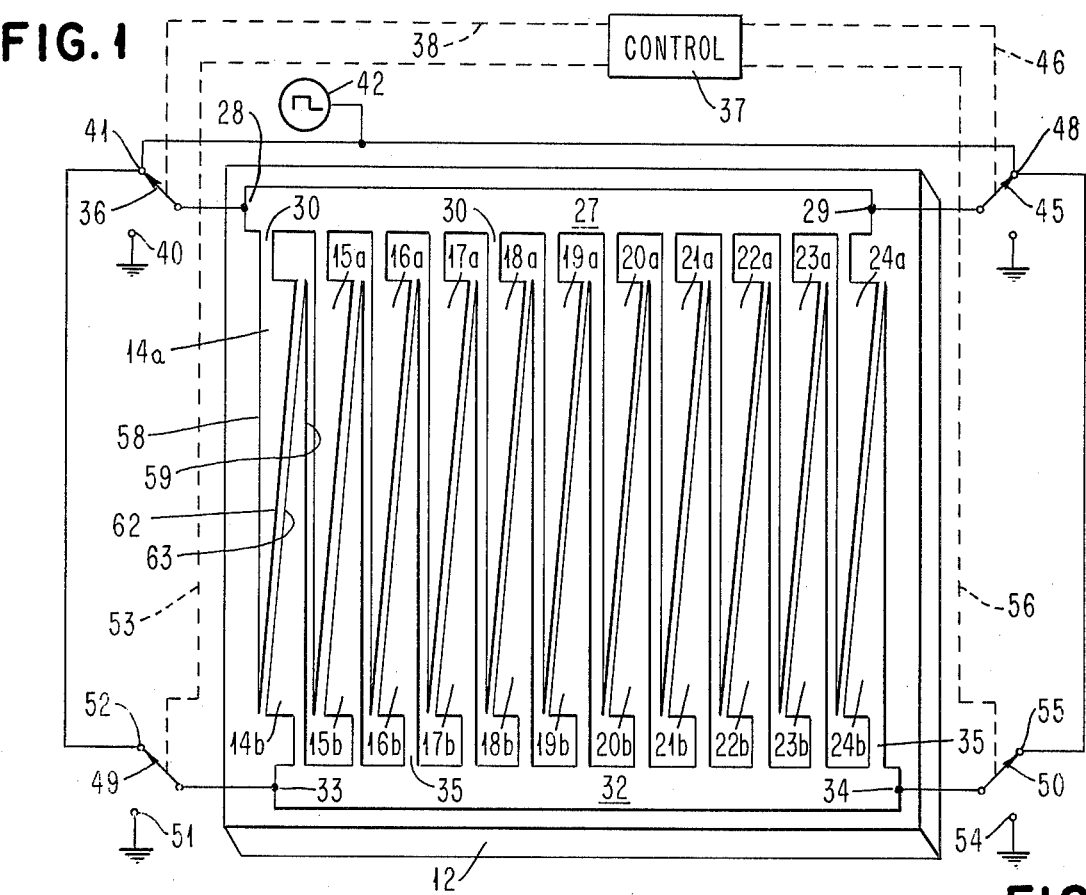
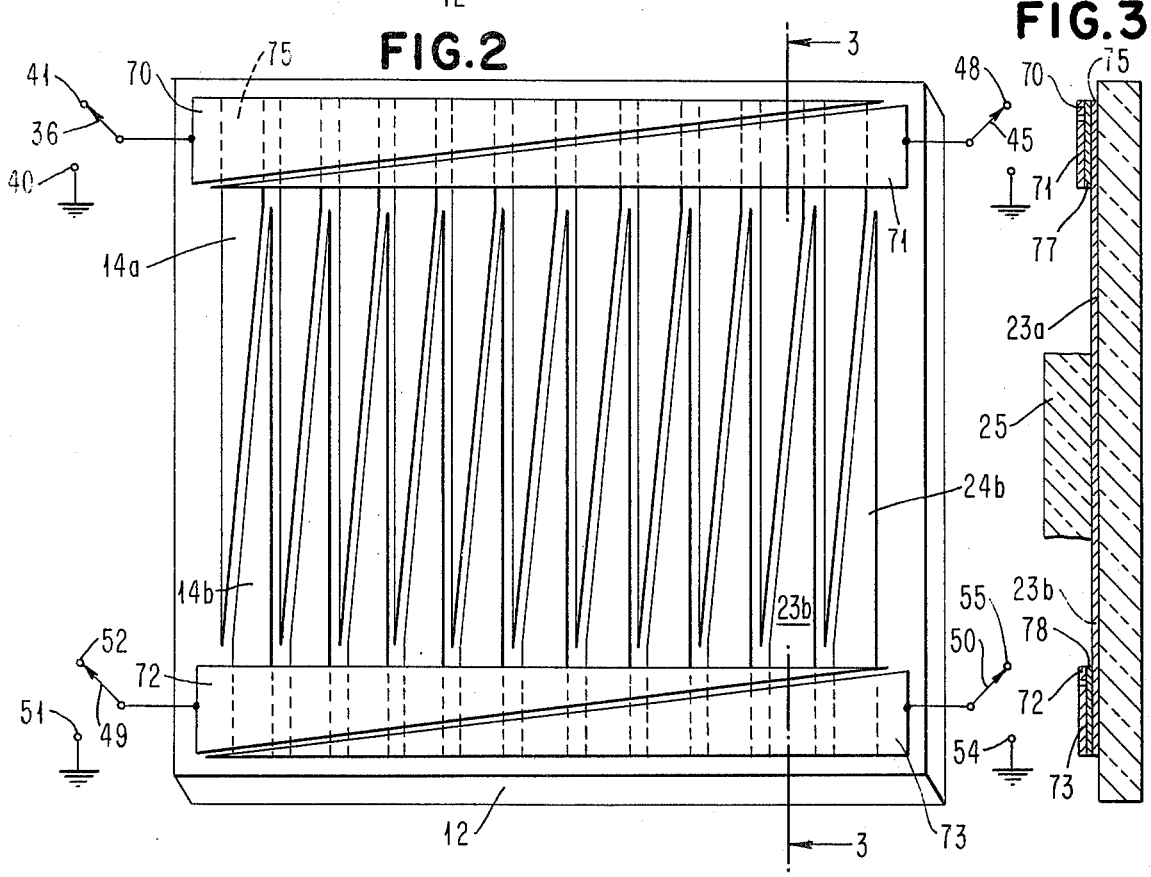

CAPACITIVE TWO DIMENSIONAL TABLET WITH SINGLE CONDUCTIVE LAYER

RELATED APPLICATIONS

Application Ser. No. 593,895, of H. Dym for "Graphic Entry Tablet With Improved Addressing", filed July 7, 1975, issued as U.S. Pat. No. 3,999,012 on Dec. 21, 1976, describes a capacitive tablet having separate conductive layers for the X dimension and the Y dimension electrodes, and it provides background information that can be helpful in understanding this invention.

INTRODUCTION

The capacitive tablet of Dym has a set of X dimension wires and a set of Y dimension wires that can be selectively connected to an oscillator that produces a particular pattern of alternating voltage on the wires of the selected dimension. (The designations X dimension and Y dimension are of course arbitrary; the terms right, left, top and bottom will similarly be assigned arbitrarily to the four sides of a tablet). The two sets of wires are located in two closely spaced planes separated by a thin layer of insulating and supporting material. Separate operations on the X dimension wires and the Y dimension wires are performed for forming the X and Y components of the pen position address. The two sets of wires and the associated circuits are closely identical except for their orientation. The general operation of the tablet can be understood by considering only the X dimension set. These wires can be thought of as running between the top and bottom edges of the tablet. In one method for locating the X dimension position of a pen, the leftmost wire is held at ground potential, the rightmost wire is given an alternating voltage of maximum amplitude, and the X dimension wires in between are given intermediate values of the alternating voltage in a pattern that can be represented by a ramp that extends from left to right across the tablet. When a pen is placed on the tablet, it picks up an alternating voltage that has an amplitude that depends on the X dimension position of the pen and can be processed to produce an X dimension address. (The pen signal also depends on the capacitive coupling between the pen and the wires, and variations on this value which can occur with variations in the height of the pen above the wires can be compensated for by an operation in which each of the wires of the X dimension is given the maximum value so that the pen senses the right hand or maximum point on the ramp without regard to its actual position. The pen position along the X dimension of the tablet is a function of the ratio of the first signal to the second signal.)

In the related application, further operations provide an address that is more precise than the address that can be formed from the ramp voltage signal alone. By contrast, the tablet of this invention uses a ramp voltage signal to form the final pen position address, and it will be helpful to review some of the conventional techniques that can be used for forming a ramp voltage in a capacitive tablet.

In one conventional technique for establishing the ramp voltage across the conductors, the wires are connected to successive tapping points on a resistor, and the left end of the resistor and the leftmost wire are connected to ground, and the alternating voltage is applied to the rightmost end of the resistor and the rightmost wire. In another technique for establishing the ramp voltage that is described in the related application, the wires are connected to individual capacitive tabs along the bottom or top of the tablet and a triangular electrode is located over the capacitive tabs so that the capacitive coupling between the triangular electrode and the individual tabs varies progressively from the leftmost tab which underlies only a small portion of the triangular electrode to the rightmost capacitive tab which underlies the full width of the triangular electrode.

Because the X dimension wires and Y dimension wires of conventional capacitive tablets are located in separate planes with an intervening insulation layer, they require careful manufacturing techniques. Errors in the pen position signals will occur if there are variations in the spacing between the two layers or if there is a misregistration between the cooperating electrodes of the two layers. One object of this invention is to simplify the manufacturing requirements for a capacitive tablet by providing a new and improved capacitive tablet that uses only a single layer of X-Y dimension electrodes.

A graphic tablet is commonly used with a display. It has been proposed to locate a graphic tablet on the face of a non-refreshed display (eg. a gas panel) to provide both graphic input and graphic output in a single device. However, the multi-layer structure of a conventional capacitive tablet makes manufacturing of such a device difficult and it can seriously reduce the light output from the display. Another object of the invention is to provide a new and improved capacitive tablet that is particularly suitable for combination with a display.

SUMMARY OF THE INVENTION

This invention provides a capacitive tablet that has a single layer of electrodes in the operating area. The tablet has improved ease of manufacture, and it permits better light transmission when the tablet is formed on the face of the display.

The single conductive layer has, for each of a number of X dimension positions, a pair of complementary triangular shaped electrodes. One of the electrodes extends upward from a voltage source along the bottom edge of the tablet and the other electrode extends downward from a voltage source along the top edge of the tablet. (These two electrodes will be called the lower and upper electrodes respectively.) The two triangular electrodes of a pair are spaced closely together throughout the active area of the tablet. For an operation of detecting the Y dimension position of a pen that is positioned over the two electrodes of some pair, the lower electrodes are all held at ground potential and the upper electrodes are each given an alternating voltage of the same predetermined amplitude. The pen signal depends on the Y dimension value of the pen position in the same general way that the voltage of a capacitive tab depends on its position under a triangular electrode in the capacitive tablet described in the preceding section of the specification. (Some specific differences will be pointed out later). A pair of electrodes is located at each of a number of X dimension positions. The neighboring electrodes of adjacent pairs also fit closely and cooperate in the same way as two electrodes that are considered to be paired to produce a Y dimension signal in a nearby pen.

For an operation to detect the X component of the pen position, the two electrodes of a pair are given the same alternating potential, and different pairs are given different alternating potentials to establish a voltage ramp across the X dimension of the tablet. Thus for an X dimension operation, the tablet of this invention becomes electrically equivalent to the X dimension wires of a conventional tablet with two conductive layers, and the pen signal is processed similarly to produce a pen position address.

THE DRAWING

FIG. 1 is a plan view of the preferred tablet of this invention illustrating one circuit for energizing the electrodes.

FIG. 2 is a plan view of the preferred tablet of this invention showing a second circuit for energizing the electrodes.

FIG. 3 is an edge view of the tablet of FIG. 2.

THE TABLET OF THE DRAWING

The Tablet of FIG. 1

Figure 4:
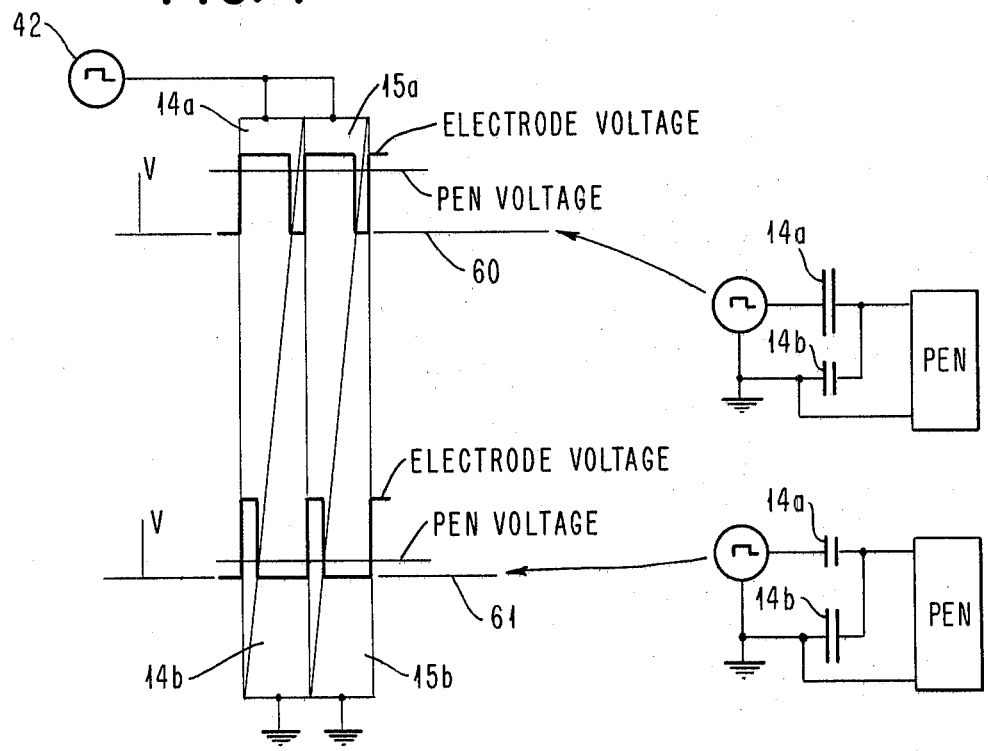
FIG. 4 shows some of the electrodes of the preferred tablet and illustrates the capacitive coupling of the electrodes to a pen.

The tablet of FIG. 1 includes a base 12 and electrodes 14a, 14b through 24a, 24b. Electrodes with the reference character suffix "a" will be called upper electrodes and electrodes with the reference character suffix "b" will be called lower electrodes. Support 12 may be of glass and the electrodes may be of copper or of a transparent conductive material. The art of forming precise conductive patterns on a non-conductive support is well developed and support 12 and the electrodes may be of any suitable materials. The support and electrodes may both be transparent for viewing a subject through the tablet or they may be opaque if a subject is not to be viewed through the tablet.

A resistor 27 is positioned along the top edge of support 12 between terminals 28 and 29, and a connection 30 is made from each upper electrode 14a–24a to a tapping point on resistor 27. Resistor 27 may be formed by a series connection of discrete resistors, but it is preferably formed by depositing on support 12 a resistive layer of the material of the electrodes or other suitable resistive material. The connections 30 are preferably of the same material as the electrodes and the electrodes, connections 30, and resistor 27 are preferably formed as a unit.

A resistor 32 is similarly formed along the bottom edge of the support 12 between terminals 33 and 34. Connections 35 connect the lower electrodes 14b–24b to tapping points on resistor 32.

The electrode elements in FIG. 1 are not shown to scale and are given an exaggerated width to better illustrate their triangular shape. The electrodes are given a length in the Y dimension that provides a useful tablet height. The structure is useful with conventional tablet heights such as 12 inches or 24 inches. The width of the pair of electrodes between lines 58, 59 in FIG. 1 is about 125 mils. The spacing between adjacent electrodes, such as between lines 62 and 63 in FIG. 1 is preferably about 10–15 mils.

The Circuit of FIG. 1

A switch 36 is connected to a control 37 by means shown as a dashed line 38 to selectively connect terminal 28 of the upper resistor 27 to either a point 40 of ground potential or to a point 41 that carries an alternating voltage that is produced by an oscillator 42. Oscillator 42 preferably produces a square wave or digital output, as the schematic drawing represents, but it may alternatively produce a sine wave or other waveform having a suitable alternating component. A switch 45 is similarly connected to control 37 by means represented by a dashed line 46 to switch terminal 29 of resistor 27 to a point of ground potential or to a point 48 having the voltage of oscillator 42. Switches 49 and 50 and associated components 51 through 56 similarly control the potential at terminals 33 and 34 of resistor 32.

Switches 36, 45, 49 and 50 are preferably semiconductor components. For example switch 36 may comprise a resistor and a transistor in a common emitter configuration with the emitter terminal connected to ground potential point 40, the common connection point of the resistor and the transistor collector terminal connected to resistor terminal 28, the other terminal of the resistor connected to point 41, and the line from control 37 connected to the base terminal of the transistor. Various implementations for control 37 will be readily understood after the operation of the tablet is described.

X Dimension Operation — FIG. 1

In one step of the operation to form the X component of the pen position, switches 36, 45, 49 and 50 are operated to connect terminals 28, 29, 33, 34 to the output of oscillator 42 (this switch condition is shown in FIG. 1). Each electrode then has the potential of the oscillator 42 and a pen receives a signal that is independent of its X and Y position but is a function of the capacitive coupling between the pen and the tablet electrodes. This pen signal is conventionally called a reference signal. Because the opposite terminals of the two resistors 27, 32, are at the same potential, the only voltage drops in a resistor are associated with the currents that charge the electrodes with respect to ground. Resistors 27, 32 are given sufficient conductance to reduce these voltage drops to a negligible value.

In another step for finding the X component of the pen position, switches 36 and 49 are operated to maintain the left edge of resistors 27 and 32 at ground and switches 45 and 50 are operated to apply the output of oscillator 42 to the right hand end of the resistors. In this switch state, a voltage difference appears across each resistor, and a different voltage appears at each tap connection 30 for the upper electrodes and connection 35 of the lower electrodes. The two complementary electrodes of a pair (such as electrodes 14A and 14B) have essentially the same voltage so that a pair of electrodes are electrically equivalent to a single rectangular electrode at each X dimension position, and the operation of the tablet for sensing the X dimension component of the address is similar to the operation of capacitive tablets having a single electrode at each X dimension position.

The voltage distribution across the tablet has a ramp shape rising from ground potential at electrode pair 14a, 14b at the left edge to the reference value at electrode pair 24a, 24b at the right edge. The X dimension position of a pen is proportional to the ratio of the signal that the pen senses during the ramp voltage operation to the reference signal. For example, suppose that the amplitude of the oscillator is 10 volts. Electrodes 24a and 24b each receive 10 volts, and electrodes 14a, 14b receive zero volts. Because there are eleven pairs of electrodes in FIG. 1, electrodes 15a and 15b receive 1 volt, electrodes 16a, 16b receive two volts and so on. Suppose that the pen receives a signal of 1 volt during the operation that establishes the reference value and receives a signal of 0.3 volts with the ramp voltage distribution. Evidently, the pen is in a neighborhood of the fourth pair of electrodes from the left, electrodes 17a and 17b.

This tablet has an advantage of other capacitive tablets that the ramp voltage is a linear function of pen position and intermediate voltage signals occur between the discrete conductor positions. In this example, a pen voltage of 2.6 volts would identify the pen position 6/10ths of the way between the midline of the electrodes 16a, 16b and the midline of electrodes 17a, 17b or, equivalently, 26/100th of the distance from the left edge of the tablet to the right edge.

The ramp voltage operation just described can of course be performed with the right edge of the tablet at ground and the left edge at the oscillator voltage. The signals from two such ramp voltage operations can be used to derive the reference voltage instead of the operation previously described in which the conductors are each at the oscillator voltage, as is well known.

Operation For Y Dimension Address Component— FIGS. 1 and 4

In the operation of sensing the Y component of the address, the switches 36 and 45 are set to apply the potential of oscillator 42 to terminals 28 and 29 of resistor 27 as shown in the drawing, and switches 49 an 50 are set to connect terminals 33 and 34 of resistor 32 to points 51, 54 of ground potential. For reasons already explained, each of the points along resistor 27 have the oscillator voltage and each of the points along resistor 32 are at ground potential. Thus, potential difference exists between each electrode and its two adjacent electrodes. Because the pen is spaced above the conductive layer by the protective layer 25 (FIG. 3), the pen is influenced by both electrodes of the underlying pair and by electrodes to either side. The capacitive coupling is a function of the size of the capacitive electrodes so that the pen senses a zero voltage along the bottom edge of the tablet and it senses the reference value of the alternating voltage along the top edge of the tablet. Between these positions, the pen senses intermediate values that can be related to the Y address component in the way that has already been described for the X dimension operation.

This effect is illustrated in FIG. 4. The location of four adjacent electrodes, 14a and b and 15a and b is represented by a faint line and connections to oscillator 42 and ground are shown to indicate that the upper electrodes 14a and 15a have the voltage of the oscillator and that the lower electrodes 14b and 15b have ground potential. Two voltage-spatial graphs are superimposed on this representation of the electrodes. Lines 60, 61 each form the abscissa of a graph and also indicate a line on the tablet where the voltages measured are for this example. FIG. 4 also shows the pen in circuit with electrodes 14a, 14b of differing areas at the two lines 60, 61. One function in each graph shows the average voltage that would be measured if the pen were in conductive contact with the electrodes. For each location, this electrode voltage rises to the value of the oscillator voltage in the region of an upper electrode and falls to ground in the region of a lower electrode. At the upper position 60, the electrode voltage is shown as a rectangular waveform having wide regions of high amplitude and narrow regions of zero voltage. Along line 61, the horizontal waveform has narrow regions of high amplitude and wide regions of zero voltage. The pen is separated from the electrodes by an insulation layer, and the pen does receive the actual electrode voltages. The conventional separation between the pen and the electrodes is sufficient to produce an averaging of the electrode voltages so that the pen voltage is averaged to an effectively uniform value at each Y dimension position, as FIG. 4 shows.

Figure 5:
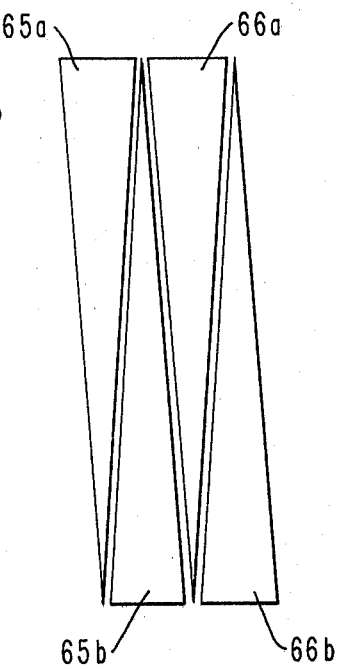
FIG. 5 shows an alternative configuration for the electrodes of the tablet.

Other Electrodes Shapes — FIG. 5

FIG. 5 shows upper electrodes 65a, 66a and lower electrodes 65b, 66b. (The conditions to the associated resistors are not shown in FIG. 5.) These electrodes are symetrical triangular shapes. FIG. 5 illustrates a variety of configurations that are closely equivalent electrically but may be chosen for particular reasons such as ease of manufacturing. From a more general standpoint, the electrodes are shaped to differently couple a pen to the upper set or lower set as a function of the Y component address.

The Tablet of FIGS. 2 and 3

FIGS. 2 and 3 show a modification of the tablet of FIG. 1. The base 12, the triangular portion of the electrodes 14a and b thru 24a and b, and the switches will be similar to the correspondingly numbered components in FIG. 1. The tablets of FIGS. 2 and 3 differs from the tablet of FIG. 1 by using a conventional arrangement of triangular capacitor plates 70 thru 73 to form a voltage divider for energizing capacitive tabs 75 that are formed as an extension of each of the electrodes. As FIG. 3 shows, the triangular capacitive plates are separated from the electrodes by layers of insulation 77, 78. The thickness of these layers is greatly exaggerated in FIG. 3, and the overlying layer of insulation of a conventional tablet structure is not shown.

For a reference voltage operation, the four switches are positioned as they are shown in the drawing to apply the oscillatory voltage to each of the triangular capacitor plates 70–73. Thus, each of the triangular electrodes 14a and b thru 24a and b receives the same oscillatory voltage by capacitive coupling between the tabs 75 and the triangular capacitor plates 70–73. For an X dimension operation, the switches 45 and 50 may be placed in the position shown in the drawing and switches 36 and 49 connected to ground terminals 40 and 51. In this switch state, the electrodes 24a and b along the right edge of the tablet are given a high capacitive coupling to the oscillator through the wide area of intersection between the triangular plates 71 and 73 and the capacitive tabs of these electrodes. Conversely, triangular electrodes 14a and b along the left edge of the tablet receive a small oscillator voltage because their tabs 75 intersect only a small area of the triangular capacitor plates. The intervening pairs of electrodes receive intermediate values of the oscillator voltage, and a voltage ramp rises from left to right across the tablet. A similar operation can be used to produce a voltage ramp that rises from right to left across the tablet.

For a Y dimension operation, the upper switches 36, 45 can be positioned as they are shown in the drawing to apply the oscillator voltage to both triangular capacitor plates 70 and 71 so that each of the upper triangular electrodes 14a thru 24a receives the oscillatory voltage. The switches 49 and 50 are connected to ground terminals 51 and 54 so that each of the lower triangular electrodes 14b thru 24b is at about ground potential. A voltage ramp rises from the bottom to the top of the tablet as has been explained in the description of the operation of the tablet of FIG. 1. A voltage ramp rising from the top of the tablet to the bottom of the tablet can be similarly produced.

The linear voltage relationship that has been described in relation to FIG. 4 is produced when the thickness of layer 25 is approximately equal to at least the width of a pair of electrodes (between lines 58 and 59 in FIG. 1).

The electrodes 14a and b-24a and b can be various shapes between lines 62 and 63, but the simple triangle shape is preferred for most applications. For a tablet with phase encoding, the electrodes and the triangular plates of FIG. 2 can be somewhat S shaped to compensate for non-linelities in the phase encoded tablet.

From this description of preferred embodiments of the invention, those skilled in the art will recognize various modifications within the spirit of the invention and the scope of the claims.

What we claim is:

1. A capacitive tablet having a single layer of electrodes in the active area of the tablet, comprising,
    a generally planar insulating member having a unitary surface forming a support,
    a plurality of electrode pairs formed on said support, each pair being shaped to establish a relatively thin line of equi-potential when the two electrodes of a pair are electrically energized at the same alternating voltage, said pairs being closely spaced to establish a parallel array of said lines on said support,
    each element of a pair being spaced apart to be differently energized and being complementarily shaped to establish a voltage gradient along each said line at the operating height of a pen above the tablet when the electrodes of a pair are differently energized, and
    means for energizing the electrodes for pen position determining operations.

2. The capacitive tablet of claim 1 wherein said electrodes are triangular in shape.

3. The capacitive tablet of claim 2 wherein said lines extend in the Y dimension of the tablet between the upper and lower edges of the active area of the tablet and said means for energizing said electrodes for a Y dimension position determining operation comprises means for applying an oscillatory voltage to the upper electrodes and a non-oscillatory voltage to the lower electrodes whereby said voltage gradient rises from bottom to top of said tablet in a ramp shape.

4. The capacitive tablet of claim 3 wherein said means for applying an oscillatory voltage to said electrodes comprises a first resistor positioned across the top of the tablet outside the active area, means connecting said upper electrodes to successive tapping points on said first resistor, a second resistor positioned across the bottom of the tablet outside the active area and means connecting said lower electrodes to successive tapping points on said second resistor, an oscillator, and switch means for selectively connecting each end of the first resistor to receive the voltage of the oscillator and each end of the second resistor to receive ground potential for a Y dimension position determining operation and for selectively and separately connecting corresponding ends of each resistor to receive the voltage of the oscillator and the other end of each resistor to receive ground potential for an X dimension position determining operation.

5. The tablet of claim 4 wherein said first and second resistors are formed on said support of the same material as said electrodes.

6. The tablet of claim 1 wherein said electrode pairs extend in the Y dimension of the tablet between upper and lower edges of the active area of the tablet and wherein said means to establish said voltage gradient along the line of an electrode pair from bottom to top comprise respectively,
    pairs of triangular shaped elements, adjacent elements extending oppositely across the active area of the tablet in an inter-digitated arrangement and individually connected with capacitive tabs located at the top and bottom of the tablet outside the active area, and
    two pairs of triangular capacitive plates, one pair of capacitive plates being positioned to have complementary coupling to the tabs at the top of the tablet and the other pair of capacitive plates being positioned to have complementary coupling to the capacitive tabs at the bottom of the tablet.

7. The tablet of claim 1 wherein the operating height of a pen above the tablet is established by a dielectric layer having a thickness at least equal to the combined width of said pair of electrodes.

8. A capacitive tablet comprising,
    a generally flat support providing an active area that is generally rectangular and having sides arbitrarily designated top, bottom, right and left,
    means operable for a Y dimension pen position sensing operation providing an oscillatory voltage of a predetermined amplitude across the top of the tablet and a non-oscillatory potential across the bottom of the tablet, whereby a ramp voltage gradient exists across the tablet, rising from bottom to top,
    conductors formed in an array on said support in a common plane and conductively isolated from each other and from said oscillatory voltage means and said ground potential means for establishing the capacitive coupling of a pen to sense said ramp voltage, and
    means operable for a separate X dimension pen position sensing operation for establishing a voltage gradient rising from left to right across the tablet.

* * * * *